(12) United States Patent
Chen et al.

(10) Patent No.: US 12,015,861 B2
(45) Date of Patent: Jun. 18, 2024

(54) PIXEL COLLECTION CIRCUIT AND IMAGE SENSOR

(71) Applicant: OmniVision Sensor Solution (Shanghai) Co., Ltd, Shanghai (CN)

(72) Inventors: Shoushun Chen, Shanghai (CN); Menghan Guo, Shanghai (CN)

(73) Assignee: OMNIVISION SENSOR SOLUTION (SHANGHAI) CO., LTD, Shanghai (CN)

( * ) Notice: Subject to any disclaimer, the term of this patent is extended or adjusted under 35 U.S.C. 154(b) by 176 days.

(21) Appl. No.: 17/731,305

(22) Filed: Apr. 28, 2022

(65) Prior Publication Data

US 2022/0256109 A1  Aug. 11, 2022

Related U.S. Application Data (63) Continuation of application No. PCT/CN2020/078229, filed on Mar. 6, 2020.

(30) Foreign Application Priority Data

Nov. 29, 2019 (CN) .......................... 201911203365.3

(51) Int. Cl.
*H04N 25/71* (2023.01)
*H04N 23/61* (2023.01)
*H04N 25/75* (2023.01)

(52) U.S. Cl.
CPC .......... *H04N 25/745* (2023.01); *H04N 23/61* (2023.01); *H04N 25/75* (2023.01)

(58) Field of Classification Search
CPC ...... H04N 25/745; H04N 23/61; H04N 25/75; H04N 25/772; H04N 5/144; H04N 25/70; H04N 25/709
See application file for complete search history.

(56) References Cited

U.S. PATENT DOCUMENTS

| | | | |
|---|---|---|---|
| 8,687,060 B1 | 4/2014 | Wolff | |
| 2018/0268553 A1* | 9/2018 | Chen | ...................... H04N 3/155 |
| 2018/0295298 A1 | 10/2018 | Zamir et al. | |

FOREIGN PATENT DOCUMENTS

| | | | | |
|---|---|---|---|---|
| CN | 108449557 A | | 8/2018 | |
| CN | 108632546 A | | 10/2018 | |
| CN | 108449557 B | * | 2/2019 | ............. H04N 5/345 |
| CN | 109842768 A | | 6/2019 | |
| EP | 3758365 A4 | * | 1/2022 | ............. H04N 5/345 |

* cited by examiner

*Primary Examiner* — Nhan T Tran
(74) *Attorney, Agent, or Firm* — IPRO, PLLC (57) ABSTRACT

The present disclosure provides a pixel collection circuit and an image sensor. The image collection circuit includes: a movement detection module configured to detect a change in a light intensity in a field of view, and generate a pixel triggering signal when the change in the light intensity exceeds a predetermined threshold so as to indicate the pixel collection circuit to be in a triggered state; and a time signal generation module coupled to the movement detection module and configured to generate a time signal upon the receipt of the pixel triggering signal, the time signal being used to represent time information about a time point at which the pixel collection circuit is triggered. The movement detection module and the time signal generation module are coupled to a reading unit, so that the reading unit scans the pixel collection circuit to output the time information about the pixel collection circuit.

11 Claims, 6 Drawing Sheets

|column|1|2|3|4|5|6|
|---|---|---|---|---|---|---|
|row|||||||
|1||||||||
|2||||||||
|3||||||||
|4|5 ms|10 ms|15 ms|20 ms|25 ms|30 ms|
|5|5 ms|10 ms|15 ms|20 ms|25 ms|30 ms|
|6|5 ms|10 ms|15 ms|20 ms|25 ms|30 ms|

Fig. 8A

|column|1|2|3|4|5|6|
|---|---|---|---|---|---|---|
|row|||||||
|1||||||||
|2||||||||
|3||||||||
|4|1|0|0|0|0|0|
|5|1|0|0|0|0|0|
|6|1|0|0|0|0|0|

Fig. 8B

|column|1|2|3|4|5|6|
|---|---|---|---|---|---|---|
|row|||||||
|1||||||||
|2||||||||
|3||||||||
|4|0.75|1|0|0|0|0|
|5|0.75|1|0|0|0|0|
|6|0.75|1|0|0|0|0|

Fig. 8C

|column|1|2|3|4|5|6|
|---|---|---|---|---|---|---|
|row|||||||
|1||||||||
|2||||||||
|3||||||||
|4|0.5|0.75|1|0|0|0|
|5|0.5|0.75|1|0|0|0|
|6|0.5|0.75|1|0|0|0|

Fig. 8D

| column | 1 | 2 | 3 | 4 | 5 | 6 |
|--------|---|---|---|---|---|---|
| row 1  |   |   |   |   |   |   |
| 2      |   |   |   |   |   |   |
| 3      |   |   |   |   |   |   |
| 4      | 0.25 | 0.5 | 0.75 | 1 | 0 | 0 |
| 5      | 0.25 | 0.5 | 0.75 | 1 | 0 | 0 |
| 6      | 0.25 | 0.5 | 0.75 | 1 | 0 | 0 |

Fig. 8E

| column | 1 | 2 | 3 | 4 | 5 | 6 |
|--------|---|---|---|---|---|---|
| row 1  |   |   |   |   |   |   |
| 2      |   |   |   |   |   |   |
| 3      |   |   |   |   |   |   |
| 4      | 0 | 0.25 | 0.5 | 0.75 | 1 | 0 |
| 5      | 0 | 0.25 | 0.5 | 0.75 | 1 | 0 |
| 6      | 0 | 0.25 | 0.5 | 0.75 | 1 | 0 |

Fig. 8F

| column | 1 | 2 | 3 | 4 | 5 | 6 |
|--------|---|---|---|---|---|---|
| row 1  |   |   |   |   |   |   |
| 2      |   |   |   |   |   |   |
| 3      |   |   |   |   |   |   |
| 4      | 0 | 0 | 0.25 | 0.5 | 0.75 | 1 |
| 5      | 0 | 0 | 0.25 | 0.5 | 0.75 | 1 |
| 6      | 0 | 0 | 0.25 | 0.5 | 0.75 | 1 |

Fig. 8G

PIXEL COLLECTION CIRCUIT AND IMAGE SENSOR

TECHNICAL FIELD

The present disclosure relates to the field of image collection technology, in particular to an image collection circuit and an image sensor.

BACKGROUND

Recently, as an important branch of an artificial intelligence technology in the field of vision application, a machine vision technology has developed rapidly. Depending on a machine vision algorithm supported by a high computing capability, the machine vision technology has widely applied in various fields such as pattern recognition, feature extraction, and moving object detection and tracking.

As a source of front-end image data, an image sensor is an important component of the entire machine vision system. Most of the image sensors output an entire image at a fixed frame rate, so information about an entire image is adopted as an input of a mainstream machine vision algorithm. However, the information includes a large quantity of redundancy information (mainly useless background information), and meanwhile for a machine vision application, dynamic information of interest in the field of view is lost. Due to these problems, an additional burden is imposed on a back-end algorithm in terms of storage and computing capability. In contrast, a dynamic vision image sensor (dynamic vision sensor for short) may meet the requirement of the machine vision on an image data source in a better manner. The dynamic vision sensor merely responds to and output the dynamic information in the field of view, and it automatically shield and filter out the useless background information. Different from the image sensor which outputs the image at a fixed frame rate, the dynamic vision sensor outputs asynchronous event streams, which are used to directly represent the dynamic information in a time-space domain.

As mentioned above, the dynamic vision sensor directly detects the dynamic information in the field of view, so as to reduce a redundancy level of the output data. However, an output format of the asynchronous event streams outputted by the dynamic vision sensor is not compatible with a format of the input data for a mainstream machine vision algorithm. Hence, when image data is collected at a front end and the dynamic vision sensor is adopted, the asynchronous event streams need to be converted into synchronous frame data. However, a large external storage space and a large computing capability are still required for the data conversion, so the efficiency of the entire image processing system will be adversely affected.

Hence, there is an urgent need to provide a new image sensor so as to solve the above-mentioned problem.

SUMMARY

An object of the present disclosure is to provide a pixel collection circuit and an image sensor, so as to solve or at least alleviate at least one of the above-mentioned problems.

In one aspect, the present disclosure provides in some embodiments a pixel collection circuit, including: a movement detection module configured to detect a change in a light intensity in a field of view, and generate a pixel triggering signal when the change in the light intensity exceeds a predetermined threshold so as to indicate the pixel collection circuit to be in a triggered state; and a time signal generation module coupled to the movement detection module and configured to generate a time signal upon the receipt of the pixel triggering signal, the time signal being used to represent time information about a time point at which the pixel collection circuit is triggered, wherein the movement detection module and the time signal generation module are coupled to a peripheral reading unit, so that the reading unit scans the pixel collection circuit to output the time information about the pixel collection circuit.

In a possible embodiment of the present disclosure, the time signal indicates an instantaneous voltage pulse when the pixel collection circuit enters the triggered state, and subsequently the time signal is attenuated over time.

In a possible embodiment of the present disclosure, the movement detection module includes: a photoelectric detection sub-module configured to monitor a light signal in real time, and output a corresponding electric signal; a triggering generation sub-module, a first input end of which is coupled to the photoelectric detection sub-module, a first output end of which is coupled to a reading interface sub-module, and a second output end of which is coupled to the time signal generation module, the triggering generation sub-module being configured to generate a triggering generation signal when the electric signal meets a predetermined triggering condition, and output the triggering generation signal to the reading interface sub-module and the time signal generation module; and the reading interface sub-module coupled to the triggering generation sub-module and configured to communicate with the reading unit.

In a possible embodiment of the present disclosure, the time signal generation module includes: a first switch, a first end of which is coupled to a fixed voltage, and a second end of which is coupled to a first end of a first buffer; a first capacitor and a first resistor connected in parallel to each other, one end of each of the first capacitor and the first resistor being grounded, and the other end of each of the first capacitor and the first resistor being coupled to the second end of the first switch and the first end of the first buffer; the first buffer, a second end of which is coupled to the first end of a second switch; and the second switch, a second end of which is coupled to a time signal column output line.

In a possible embodiment of the present disclosure, the time signal generation module includes: a third switch, a first end of which is coupled to a fixed voltage, and a second end of which is coupled to a first end of a second buffer; a second capacitor and a constant current source connected in parallel to each other, one end of each of the second capacitor and the constant current source being grounded, and the other end of each of the second capacitor and the constant current source being coupled to the second end of the third switch and the first end of the second buffer; the second buffer, a second end of which is coupled to a first end of a fourth switch; and the fourth switch, a second end of which is coupled to a time signal column output line.

In a possible embodiment of the present disclosure, the first switch or the third switch is controlled by the pixel triggering signal from the movement detection module, and when the pixel triggering signal is active, the first switch or the third switch is turned on; and the second switch or the fourth switch is controlled by a time signal row selection signal from the reading unit, and when the time signal row selection signal is active, the second switch or the fourth switch is turned on.

In a possible embodiment of the present disclosure, the first resistor is an adjustable resistor, and an attenuation rate of the time signal is determined in accordance with a time constant consisting of the first capacitor and the first resistor.

In a possible embodiment of the present disclosure, an attenuation rate of the time signal is determined in accordance with the second capacitor and the constant current source.

In another aspect, the present disclosure provides in some embodiments an image sensor, including: a pixel collection circuit array including a plurality of the above-mentioned pixel collection circuits; a global control unit configured to control an initial operating state of the pixel collection circuit array; and a reading unit configured to scan the pixel collection circuit array progressively, so as to output time information about the pixel collection circuit array.

In a possible embodiment of the present disclosure, the reading unit includes: a row selection module configured to control the pixel collection circuit array in a row direction; a column selection module configured to control the pixel collection circuit array in a column direction; and a reading control module coupled to the row selection module and the column selection module, and configured to control an output of each of the row selection module and the column selection module.

In a possible embodiment of the present disclosure, the row selection module includes: a movement detection row selection sub-module coupled to the movement detection module of the pixel collection circuit via a movement detection row request line and a movement detection row selection line, and configured to respond to a row request signal from the pixel collection circuitry array; and a time signal row selection sub-module coupled to the time signal generation module of the pixel collection circuit via each time signal row selection line, and configured to progressively set the time signal row selection lines of the pixel collection circuit as active.

In a possible embodiment of the present disclosure, the column selection module includes: a movement detection column selection sub-module coupled to the movement detection module of the pixel collection circuit via a movement detection column request line and a movement detection column selection line, and configured to respond to a column request signal from the pixel collection circuit array, the column request signal being active when the pixel collection circuit obtains a row response; and a time signal column selection sub-module coupled to the time signal generation module of the pixel collection circuit via a time signal column output line, and configured to read the time signal of the pixel collection circuit via the time signal column output line, the time signal being outputted by the pixel collection circuit when a time signal row selection line coupled to the pixel collection circuit is active.

In a possible embodiment of the present disclosure, the global control unit is further configured to reset the pixel collection circuit array when the image sensor is powered on, and control the pixel collection circuit array to operate when the pixel collection circuit array is maintained in a stable initial state.

According to the image sensor in the embodiments of the present disclosure, the pixel collection circuit is provided with the additional time signal generation module for generating a local time signal. Usually, the time signal is a voltage signal, and it is an instantaneous voltage pulse when an event has been detected by the pixel collection circuit and then attenuated gradually to indicate the elapse of time. The peripheral reading unit is provided with an additional time signal row selection sub-module and an additional time signal column selection sub-module, so as to regularly scan the time signals outputted by the time signal generation modules of all the pixel collection circuits, thereby to generate and output a time surface frame.

In a word, the image sensor may asynchronously detect the dynamic information like the conventional dynamic vision sensor, and directly output the time surface frame representing the time information about the pixel collection circuit to a back-end machine vision algorithm. The time surface frame may be used by the back-end machine vision algorithm as a train sample, and use to implement such tasks as object identification and tracking. As a result, it is able to reduce the overhead of storage and computation for data conversion at a back end of an image processing system, thereby to improve the efficiency of the image processing system.

BRIEF DESCRIPTION OF THE DRAWINGS

In order to achieve the above and related objects, some descriptive aspects will be described in conjunction with the following description and drawings, and these aspects indicate various ways capable of practicing a principle of the present disclosure. All aspects and equivalent aspects thereof shall fall within the scope of the present disclosure. The above and other objects, features and advantages will become more apparent on the basis of the drawings in conjunction with the following description. Same reference signs represent a same component or element.

DETAILED DESCRIPTION

The present disclosure will be described hereinafter in more details in conjunction with the drawings and embodiments. The following embodiments are for illustrative purposes only, but shall not be used to limit the scope of the present disclosure. In contrast, the following embodiments are provided so as to facilitate the understanding of the present disclosure.

Figure 1:
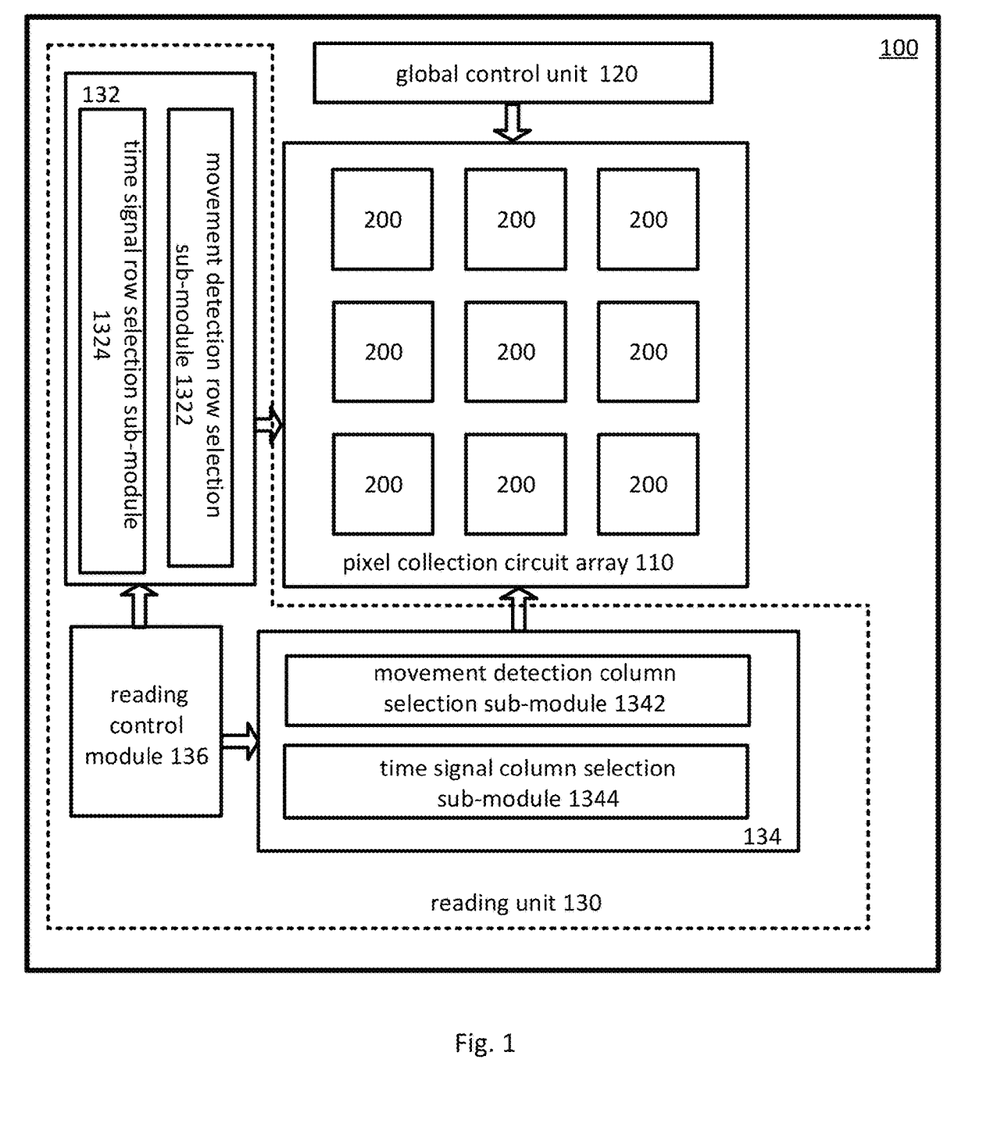
FIG. 1 is a schematic view showing an image sensor according to one embodiment of the present disclosure.

FIG. 1 is a schematic view showing an image sensor 100 according to one embodiment of the present disclosure. The image sensor 100 is applied to a scenario where an object moving at a high speed is to be detected, so as to output an event data stream associated with a motion event. In a possible embodiment of the present disclosure, the image sensor 100 is coupled to an external image processor (not shown), and outputs an image representing time information to the external image processor for the subsequent calculation and application. Usually, the image processor is used to implement some machine vision algorithms, e.g., object detection and object tracking, which will not be particularly defined herein.

As shown in FIG. 1, the image sensor 100 includes a pixel collection circuit array 110, a global control unit 120 and a reading unit 130. As a core of the image sensor 100, the pixel collection circuit array 110 consists of a plurality of pixel collection circuits 200 arranged evenly in both a row direction and a column direction. FIG. 1 shows a 3*3 pixel collection circuit array.

The global control unit 120 is coupled to the pixel collection circuit array 110, and configured to control an initial operating state of the pixel collection circuit array 110. Generally, the global control unit 120 takes charge of resetting the entire pixel collection circuit array 110 when the image sensor 100 is powered on, so as to enable each pixel collection circuit 112 to be maintained in a stable initial state. Then, the pixel collection circuit array 110 starts to operate normally.

The reading unit 130 is coupled to the pixel collection circuit array 110. In the embodiments of the present disclosure, the reading unit 130 is configured to manage events generated by the pixel collection circuit array 110, and scan the time signal generated by the pixel collection circuit array 110 to generate an image associated with time information about the pixel collection circuit array 110. A position of a pixel in the image indicates a row address and a column address of the pixel collection circuit, and a size of the pixel is a size of the time signal generated by the pixel collection circuit. In a possible embodiment of the present disclosure, the image is called as a time surface frame (TimeSurface) which reflects the distribution of dynamic information in a field of view in time and space over a small time period. In addition, the above two functions of the reading unit 130 are independent of each other.

In order to achieve the above functions, the reading unit 130 includes three sub-units, i.e., a row selection module 132, a column selection module 134 and a reading control module 136. The row selection module 132 is configured to manage the pixel collection circuit array 110 in the row direction, the column selection module 134 is configured to manage the pixel collection circuit array 110 in the column direction, and the reading control module 136 is configured to coordinate the row selection module 132 and the column selection module 134.

Figure 2:
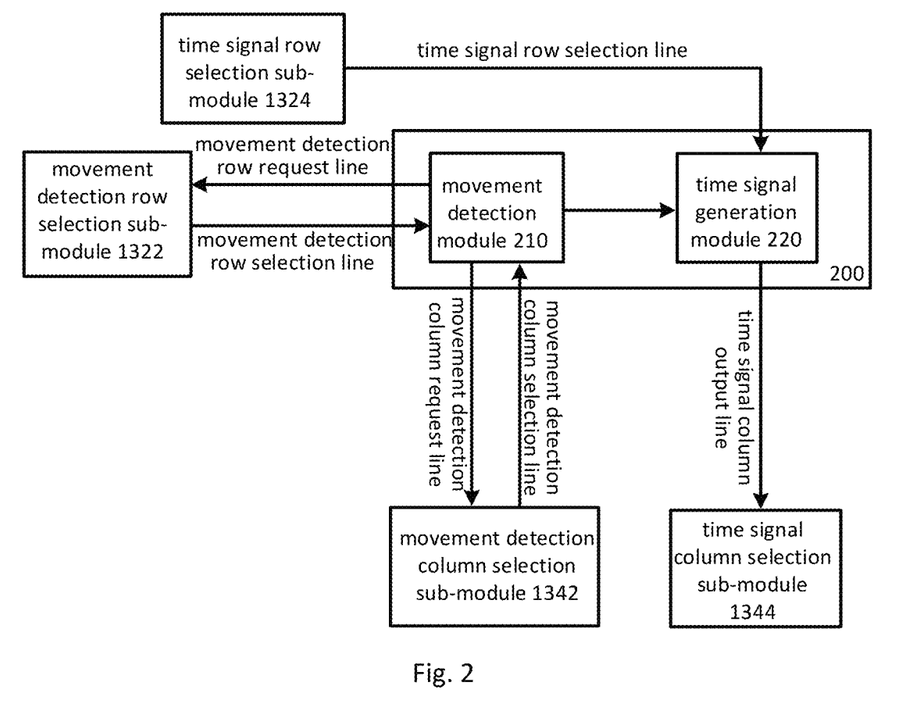
FIG. 2 is a schematic view showing a pixel collection circuit according to one embodiment of the present disclosure.

Different from a conventional dynamic vision sensor, in the image sensor 100, the pixel collection circuit 200 includes not only a movement detection module 210 but also a time signal generation module 220, as shown in FIG. 2. The movement detection module 210 is configured to detect dynamic information in the field of view. The time signal generation module 220 is configured to generate a local time signal, and the time signal is used to represent time information about a time point at which the pixel collection circuit is triggered. To be specific, the movement detection module 210 is configured to detect in real time a change in a light intensity in the field of view, and generate a pixel triggering signal when the change in the light intensity exceeds a predetermined threshold so as to indicate the pixel collection circuit to be in a triggered state. At this time, one event has been detected by the pixel collection circuit 200. The time signal generation module 220 of the pixel collection circuit 200 generates a local time signal, and usually the time signal is a voltage signal. The time signal indicates an instantaneous voltage pulse when the pixel collection circuit 200 enters the triggered state, and subsequently an amplitude of the time signal is attenuated over time. Hence, through obtaining the amplitude of the time signal at a certain time point, it is able to determine whether and when an event is detected by the pixel collection circuit 200. In some embodiments of the present disclosure, on the basis of the movement detection module 210 and the time signal generation module 220 of the pixel collection circuit 200, the row selection module 132 includes a movement detection row selection sub-module 1322 and a time signal row selection sub-module 1324, and the column selection module 132 includes a movement detection column selection sub-module 1342 and a time signal column selection sub-module 1344, as shown in FIG. 1.

For each pixel collection circuit 200 in the pixel collection circuit array 110, the reading unit 130 is coupled thereto via a corresponding bus, so as to manage the event and scan the time signal. In addition, for the reading unit 130, the managing of the event is independent of the scanning of the time signal. The two procedures will be described hereinafter in more details in conjunction with FIG. 2.

The movement detection row selection sub-module 1322 is coupled to the movement detection module 210 of the pixel collection circuit 200 via a movement detection row request line and a movement detection row selection line, and the movement detection column selection sub-module 1342 is coupled to the movement detection unit 210 of the pixel collection circuit 200 via a movement detection column request line and a movement detection column selection line. In a possible embodiment of the present disclosure, when a certain pixel collection circuit 200 has entered the triggered state, the movement detection module 210 of the pixel collection circuit 200 may set a corresponding movement detection row request line as active. The movement detection row selection sub-module 1322 may manage all the movement detection row request lines for the pixel collection circuit array 110, and response to a received row request signal. In a possible embodiment of the present disclosure, the movement detection row selection module 1322 sets a corresponding movement row selection lien as active, so as to respond to active row request signal. When a response has been obtained with respect to a row request signal from the pixel collection circuits in a certain row, column request signals from the pixel collection circuits in the row are active. At this time, the movement detection column selection sub-module 1342 respond to these column request signals. To be specific, the movement detection column selection sub-module 1342 manages all the column request signals in the column direction, and set a corresponding movement detection column selection line as active to release the corresponding pixel collection circuit from being in the triggered state, so that the pixel collection circuit may respond to the change in the light intensity again. When all the pixel collection circuits in the triggered state in the row have been released from being in the triggered state, the reading control module 136 notifies the movement detection row selection sub-module 1322 to perform a row switching operation. The movement detection row selection sub-module 1322 cancels a movement detection row selection signal for a current row, and selects a next row, until all the pixel collection circuits in the pixel collection circuit array 110 have been scanned.

Identically, the time signal row selection sub-module 1324 is coupled to the time signal generation module 220 of the pixel collection circuit 200 via a time signal row selection line, and the time signal column selection sub-module 1344 is coupled to the time signal generation module 220 of the pixel collection circuit 200 via a time signal column output line. In a possible embodiment of the present disclosure, the time signal row selection sub-module 1324 sets the time signal row selection lines as active progressively (e.g., a first time signal row selection line is set as active at first). When the time signal row selection line coupled to the pixel collection circuit 200 is active, the pixel collection circuit 200 outputs the time signal to the time signal column output line. At this time, the time signal column selection sub-module 1344 scans the time signals from the pixel collection circuit 200 progressively via the time signal column output line. When the time signals from the pixel collection circuits 200 in a current row have been read, the reading control module 136 notifies the time signal row selection sub-module 1324 to perform a row switching operation. The time signal row selection sub-module 1324 cancels the time signal row selection signal for the current row, and selects a next row, until the time signals from the pixel collection circuits 200 in a last row have been read. At this time, a time surface frame is formed. Then, the reading control module 136 cancels the time signal row selection signal for the last row, and sets the time signal row selection signal for the first row as active for the subsequent reading of a next time surface frame.

Based on the above-mentioned reading mechanism, the image sensor 100 outputs a synchronous time surface frame. The time surface frame includes time-space information about an object moving the field of view, and it may be directly used by the back-end machine vision algorithm as a training sample for implementing such tasks as object identification and object tracking. During the implementation, the movement detection row selection sub-module 1322 and the movement detection column selection sub-module 1342 may be implemented in the form of a selection scanning circuit or a decision circuit, and the time signal row selection sub-module 1324 and the time signal column selection sub-module 1344 may be implemented in the form of a full scanning circuit. The above circuits are known in the art and thus will not be particularly defined herein.

Structures of the movement detection module 210 and the time signal generation module 220 of the pixel collection circuit 200 will be described hereinafter.

Similar to the pixel collection circuit of the conventional dynamic vision sensor, the movement detection module 210 includes a photoelectric detection sub-module 212, a triggering generation sub-module 214 and a reading interface sub-module 216 coupled to each other. The photoelectric detection sub-module 212 is configured to monitor in real time a light signal, and output a corresponding electric signal. A first input end of the triggering generation sub-module 214 is coupled to the photoelectric detection sub-module 212, a first output end thereof is coupled to the reading interface sub-module 216, and a second output end thereof is coupled to the time signal regeneration module 220. When the electric signal meets a predetermined triggering condition, the triggering generation sub-module 214 generates a triggering generation signal and outputs it to the reading interface sub-module 216 and the time signal generation module 220. The reading interface sub-module 216 is coupled to the triggering generation sub-module 214, so as to communicate with the reading unit 130. The movement detection module 210 is known in the conventional dynamic vision sensor, and thus will not be particularly defined herein.

As mentioned hereinabove, the time signal indicates an instantaneous voltage pulse when the pixel collection circuit 200 enters the triggered state, and subsequently the time signal is attenuated over time. In the embodiments of the present disclosure, the time signal may be attenuated exponentially or linearly, which will not be particularly defined herein.

Figure 3:
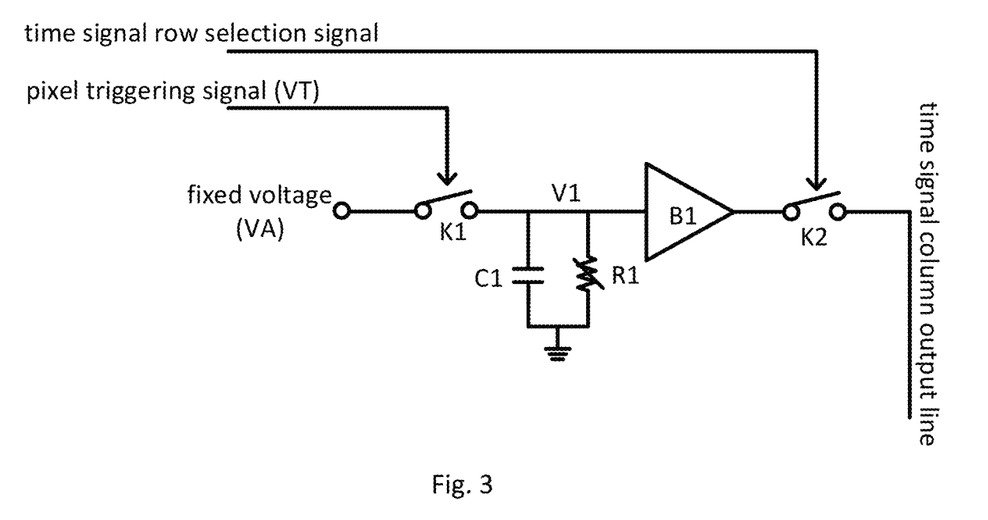
FIG. 3 is a schematic view showing a time signal generation module according to one embodiment of the present disclosure.
Figure 5:
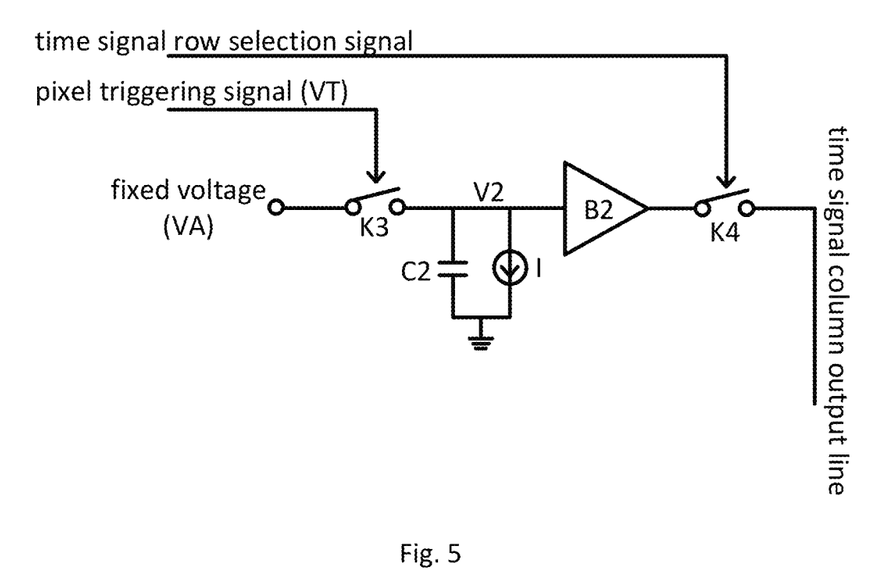
FIG. 5 is another schematic view showing the time signal generation module according to one embodiment of the present disclosure.

Depending on different attenuation modes of the time signal, FIGS. 3 and 5 show two time signal generation modules 220, where for the time signal generation module 220 in FIG. 3, the time signal is attenuated exponentially, while for the time signal generation module 220 in FIG. 5, the time signal is attenuated linearly.

As shown in FIG. 3, the time signal generation module 220 includes a first switch K1, a first capacitor C1, a first resistor R1, a first buffer B1 and a second switch K2. A first end of the first switch K1 is coupled to a fixed voltage VA, and a second end thereof is coupled to a first end of the first buffer B1. The first capacitor C1 and the first resistor R1 are connected in parallel, one end of each of the first capacitor C1 and the first resistor R1 is grounded, and the other end is coupled to the second end of the first switch K1 and the first end of the first buffer B1. A second end of the first buffer B1 is coupled to a first end of the second switch K2, and a second end of the second switch K2 is coupled to a time signal column output line. In addition, the first switch K1 is controlled by a pixel triggering signal from the movement detection module 210, and when the pixel triggering signal is active, the first switch K1 is turned on. The second switch K2 is controlled by a time signal row selection signal from the reading unit 130, and when the time signal row selection signal is active, the second switch K2 is turned on. In a possible embodiment of the present disclosure, the first resistor R1 is an adjustable resistor. An attenuation rate of the time signal is determined in accordance with a time constant consisting of the first capacitor C1 and the first resistor R1.

FIGS. 4A to 4D show waveforms of the time signal generated by the time signal generation module 220 in FIG. 3.

Figure 4A:
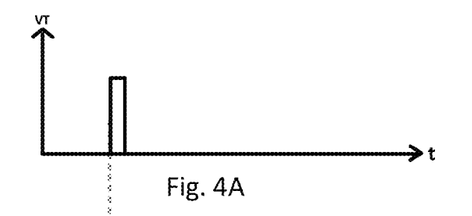
FIGS. 4A to 4D are oscillograms of a time signal according to one embodiment of the present disclosure.
Figure 4B:
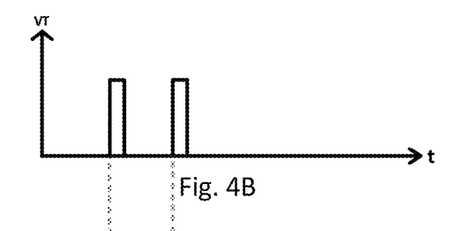
Figure 4C:
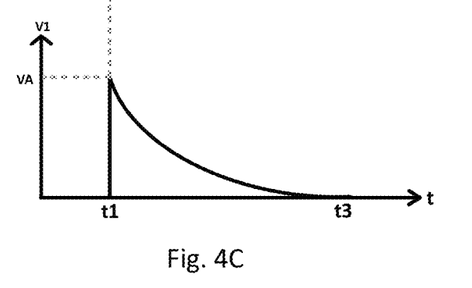
Figure 4D:
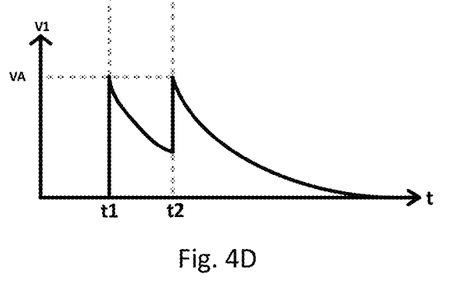

FIG. 4A shows the time signal generated when the pixel collection circuit 200 is triggered once, and FIG. 4B shows the time signal generated when the pixel collection circuit 200 is triggered many times (e.g., when the pixel collection circuit 200 is triggered twice consecutively). In these figures, an x-axis represents time t, and a y-axis represents the pixel triggering signal VT. FIGS. 4C and 4D show the waveforms corresponding to the time signals in FIGS. 4A and 4B respectively. In these figures, an x-axis represents time t, and a y-axis represents a voltage V1 of the time signal.

As shown in FIGS. 4A and 4C, when the pixel collection circuit is not triggered (t<t1), the pixel triggering signal VT is at a low level, so the first switch K1 is turned off, and V1 is discharged to 0V through the first resistor R1. At t1, the pixel collection circuit 200 is triggered, and the pixel triggering signal VT is a very short pulse signal. At this time, the first switch K1 is turned on, and the first capacitor C1 is forcibly charged to the fixed voltage VA, i.e., V1 is instantaneously pulled up to VA at t1. Then, the pixel triggering signal is inactive, the first switch K1 is turned off again, and the first capacitor C1 is slowly discharged through the first resistor R1, i.e., V1 is attenuated exponentially. When t>t3, V1 is attenuated to 0V.

As shown in FIGS. 4B and 4D, the pixel collection circuit 200 is triggered at t1 and t2, and there is a short time period between t1 and t2. At t1, the pixel triggering signal VT is a narrow pulse, so the first switch K1 is turned on and the time signal V1 is forcibly pulled up to the fixed voltage VA. Then, the first switch K1 is turned off, and V1 is attenuated exponentially. Then, the pixel collection circuit 200 is triggered again at t2, the pixel triggering signal VT is a narrow pulse again, and the time signal V1 is pulled up to VA again. Then, the first switch K1 is turned off, and V1 is attenuated exponentially. When the pixel collection circuit is read, the time signal row selection signal is active, so the second switch K2 is turned on, V1 is delivered to the time signal column output line via the first buffer B1, and the column selection module 134 obtains and outputs V1.

Based on the oscillograms of the time signals, an instantaneous amplitude of the time signal at a certain time point may represent time information about a time period between a time point where the pixel collection circuit is triggered and a current time point. In other words, the larger the instantaneous amplitude, the smaller the time period; the smaller the instantaneous amplitude, the larger the time period. As mentioned hereinabove, the attenuation rate of the time signal is determined in accordance with the time constant consisting of the first capacitor C1 and the first resistor R1. In order to facilitate the adjustment of the attenuation rate, the first resistor R1 is an adjustable resistor. A resistance of the first resistor R1 may be changed according to the practical need, so as to adjust the attenuation rate of the time signal.

FIG. 5 shows the time signal generation module 220 where the time signal is attenuated linearly. Different from that in FIG. 3, the first resistor R1 is replaced with a constant current source I. When a third switch K3 is turned off, a second capacitor C2 is discharged through the constant current source I, so that the time signal V2 is attenuated linearly over time. As shown in FIG. 5, the time signal generation module 220 includes the third switch K3, the second capacitor C2, the constant current source I, a second buffer B2 and a fourth switch K4. A first end of the third switch K3 is coupled to a fixed voltage VA, and a second end thereof is coupled to a first end of the second buffer B2. The second capacitor C2 and the constant current source I are connected in parallel, one end of each of the second capacitor C2 and the constant current source I is grounded, and the other end is coupled to a second end of the third switch K3 and the first end of the second buffer B2. A second end of the second buffer B2 is coupled to a first end of the fourth switch K4, and a second end of the fourth switch K4 is coupled to a time signal column output line. In the time signal generation module 220, the third switch K3 is controlled by the pixel triggering signal from the movement detection module 210, and when the pixel triggering signal is active, the third switch K3 is turned on. The fourth switch K4 is controlled by the time signal row selection signal from the reading unit 130, and when the time signal row selection signal is active, the fourth switch K4 is turned on. In a possible embodiment of the present disclosure, the attenuation rate of the time signal is determined in accordance with the second capacitor C2 and the constant current source I.

Figure 6A:
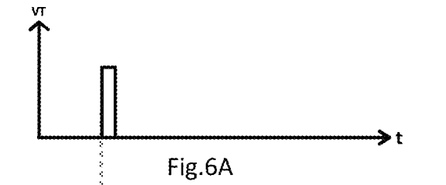
FIGS. 6A to 6D are oscillograms of the time signal according to one embodiment of the present disclosure.
Figure 6B:
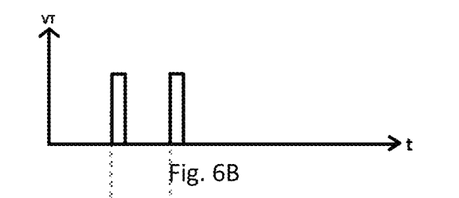
Figure 6C:
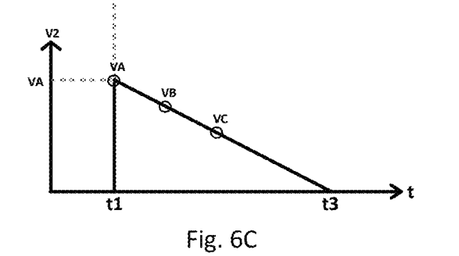
Figure 6D:
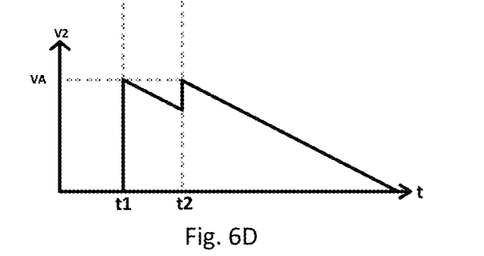

FIGS. 6A to 6D show the waveforms of the time signal generated by the time signal generation module 220 in FIG. 5. FIG. 6A shows the time signal generated when the pixel collection circuit 200 is triggered once, and FIG. 6B shows the time signal generated when the pixel collection circuit 200 is triggered many times (e.g., when the pixel collection circuit 200 is triggered twice consecutively). In these figures, an x-axis represents time t, and a y-axis represents the pixel triggering signal VT. FIGS. 6C and 6D show the waveforms corresponding to the time signals in FIGS. 6A and 6B respectively. In these figures, an x-axis represents time t, and a y-axis represents a voltage V2 of the time signal.

As shown in FIGS. 6A and 6C, when the pixel collection circuit is not triggered (t<t1), the pixel triggering signal VT is at a low level, so the third switch K3 is turned off, and V2 is discharged to 0V through the constant current source I. At t1, the pixel collection circuit 200 is triggered, and the pixel triggering signal VT is a very short pulse signal. At this time, the third switch K3 is turned on, and the second capacitor C2 is forcibly charged to the fixed voltage VA, i.e., V2 is instantaneously pulled up to VA at t1. Then, the pixel triggering signal is inactive, the third switch K3 is turned off again, and the second capacitor C2 is slowly discharged through the constant current source I, i.e., V2 is attenuated linearly. When t>t3, V2 is attenuated to 0V.

Identically, as shown in FIGS. 6B and 6D, the pixel collection circuit 200 is triggered at t1 and t2, and there is a short time period between t1 and t2. At t1, the pixel triggering signal VT is a narrow pulse, so the third switch K3 is turned on and the time signal V2 is forcibly pulled up to the fixed voltage VA. Then, the third switch K3 is turned off, and V2 is attenuated linearly. Then, the pixel collection circuit 200 is triggered again at t2, the pixel triggering signal VT is a narrow pulse again, and the time signal V2 is pulled up to VA again. Then, the third switch K3 is turned off, and V2 is attenuated linearly. When the pixel collection circuit is read, the time signal row selection signal is active, so the fourth switch K4 is turned on, V2 is delivered to the time signal column output line via the second buffer B2, and the column selection module 134 obtains and outputs V2.

The time information represented by the instantaneous amplitude of the time signal may be understood in a better manner through the waveform of the time signal generated when the pixel collection circuit is triggered once in FIG. 6C. In order to facilitate the description, a linear discharging time period (t1 to t3) is 20 ms, i.e., VA is completely discharged to 0V after 20 ms. In addition, for ease of understanding, an instantaneous voltage amplitude is normalized in accordance with an amplitude of VA, i.e., the instantaneous voltage amplitude is a normalized amplitude within a range from 0 to 1. As shown in FIG. 6C, when the pixel collection circuit 200 is read and the normalized amplitude obtained on the time signal output line is 1, it means that the pixel collection circuit 200 is just triggered at a reading time point, or the pixel collection circuit 200 has been triggered for 0 ms at the reading time point. When the normalized amplitude is 0.75 (i.e., VB in FIG. 6C), it means that the pixel collection circuit 200 has been triggered for 5 ms at the reading time point. When the normalized amplitude is 0.5 (i.e., VC in FIG. 6C), it means that the pixel collection circuit 200 has been triggered for 10 ms at the reading time point. When the normalized amplitude is 0, it means that the pixel collection circuit 200 has been triggered for more than 20 ms at the reading time point, or the pixel collection circuit 200 has not been triggered yet. The pixel collection circuit 200 which was triggered a long time ago may be considered that as non-triggered pixel collection circuit, because the time surface frame merely focuses on the movement generated at the current time point and a time point immediately before the current time point, rather than the movement generated a long time ago. It should be appreciated that, the value of the linear discharging time and the value of the normalized amplitude are for illustrative purposes only, and the present disclosure is not limited thereto.

As mentioned hereinabove, the attenuation rate of the time signal is determined by the second capacitor C2 and the constant current source I. The larger the second capacitor C2 and the smaller the constant current source I, the smaller the attenuation rate of the time signal; the smaller the second capacitor C2 and the larger the constant current source I, the larger the attenuation rate of the time signal.

In addition, it should be appreciated that, FIGS. 3 and 5 merely show the exemplary time signal generation modules 220 where the time signals are attenuated exponentially and linearly respectively, and the time signal generation module 220 where the time signal is attenuated in the other forms may be implemented in different ways, which will not be particularly defined herein.

Figure 7:
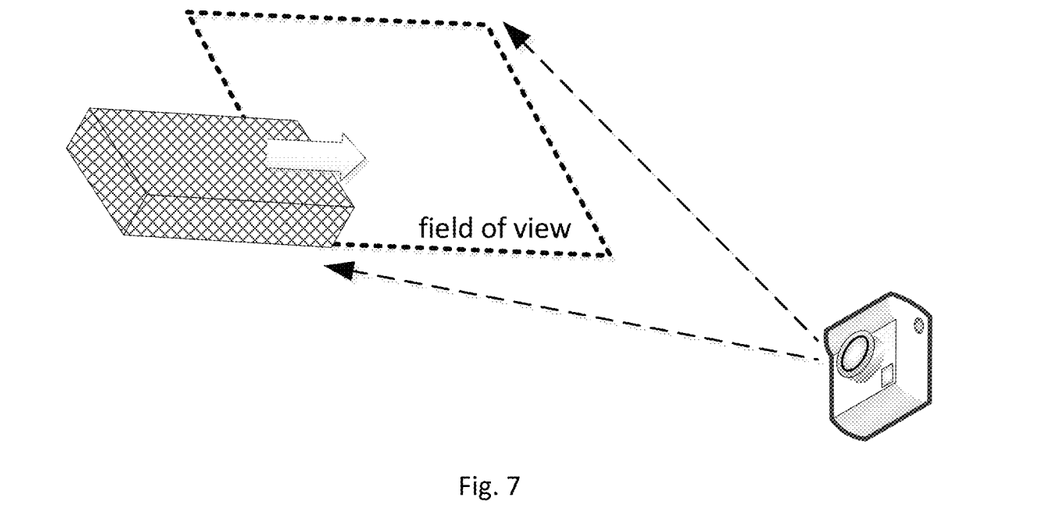
FIG. 7 is a schematic view showing a field of view according to one embodiment of the present disclosure.

The information about the time surface frame from the image sensor 100 will be further described hereinafter in conjunction with a specific scenario. FIG. 7 shows a field of view according to one embodiment of the present disclosure, and FIGS. 8A to 8G show the time surface fame in the scenario in FIG. 7.

For ease of description, the pixel collection circuit array 110 of the image sensor 100 includes pixel collection circuits 200 in 6 rows and 6 columns. As shown in FIG. 7, the field of view corresponding to the pixel collection circuit array 110 is a white background. A black object A (filled with grids in FIG. 7) enters the field of view from the bottom left and moves horizontally to a rightmost side of the field of view. A movement trajectory of the object A covers all the pixel collection circuits in a fourth row to a sixth row.

Figure 8A:
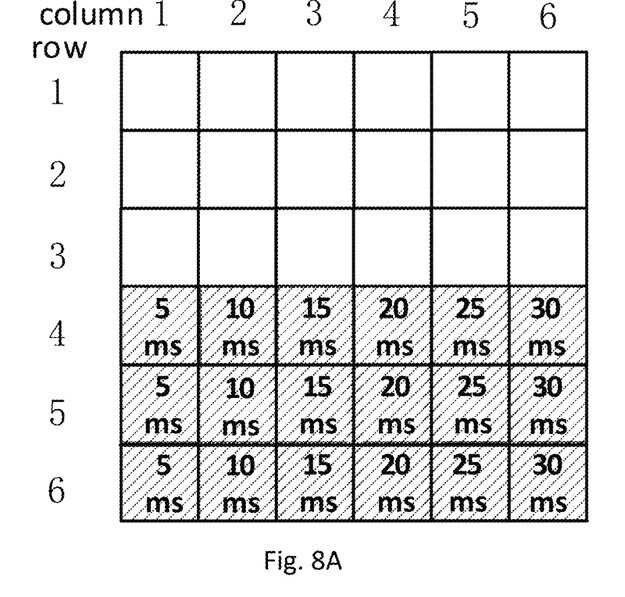
FIGS. 8A to 8G are schematic views showing a time surface frame outputted in a scenario in FIG. 7.

The object A is located at a left boundary of the field of view at a time point 0, and its movement speed is 5 ms per pixel collection circuit. In FIG. 8A, the pixel collection circuits triggered by the object A are filled with "/", and a corresponding triggering time point is shown. For example, a pixel collection circuit in a fifth row and a fourth column is triggered at 20 ms. The pixel collection circuits not filled with "/" are non-triggered pixel collection circuits. As mentioned hereinabove, for the output of a complete time surface frame, the time signal row selection sub-module 1324 and the time signal column selection sub-module 1344 need to scan the entire pixel collection circuit array 110 progressively under the control of the reading unit 130, so as to obtain the time signal generated by the time signal generation module 220 of each pixel collection circuit 200.

Here, the time signal generation module 220 in FIG. 5 is adopted. In addition, a discharging time is set as 20 ms, and an output amplitude is normalized, so as to describe the output of the time information (i.e., the time surface frame) about the pixel collection circuit.

When a triggering time point of a pixel collection circuit 200 is closer to a reading time point of a current time surface frame, a corresponding normalized amplitude is closer to 1, and in contrast, the corresponding normalized amplitude is closer to 0. When one time surface frame is obtained by the reading unit 130 every 5 ms, the image sensor 100 outputs six time surface frames from 5 ms to 30 ms, as shown in FIGS. 8B to 8G. The time surface frames are marks as time surface frame 1, time surface frame 2, time surface frame 3, . . . , and time surface frame 6 outputted at time points as 5 ms, 10 ms, 15 ms, 20 ms, 25 ms and 30 ms respectively.

Figure 8B:
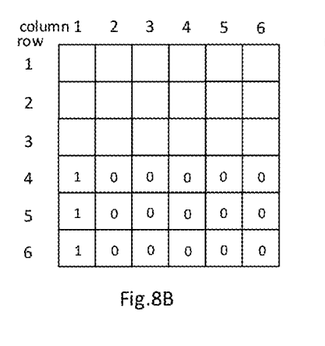

For FIG. 8B (i.e., the time surface frame 1), its reading time point is 5 ms. At and before the reading time point, merely the pixel collection circuits in a first column and in fourth to sixth rows are triggered at the time point 5 ms. Hence, in the time surface frame 1, the normalized amplitudes of these pixel collection circuits are 1, and the normalized amplitudes of the other pixel collection circuits are 0.

Figure 8C:
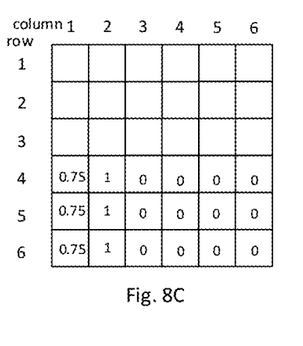

For FIG. 8C (i.e., the time surface frame 2), its reading time point is 10 ms. At and before the reading time point, the pixel collection circuits in a first column and in fourth to sixth rows are triggered at the time point 5 ms, so the normalized amplitudes of these pixel collection circuits are 0.75 (1−(10 s−5 ms)/20 ms). The pixel collection circuits in a second column and in fourth to sixth rows are triggered at the time point 10 ms, so the normalized amplitudes of these pixel collection circuits are 1. The normalized amplitudes of the other pixel collection circuits are 0.

Figure 8D:
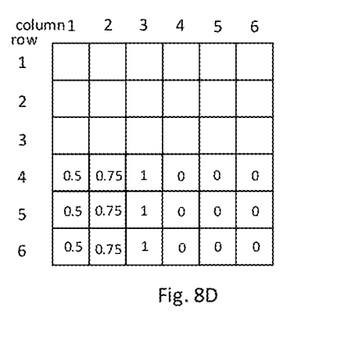

For FIG. 8D (i.e., the time surface frame 3), its reading time point is 15 ms. At and before the reading time point, the pixel collection circuits in a first column and in fourth to sixth rows are triggered at the time point 5 ms, so the normalized amplitudes of these pixel collection circuits are 0.5 (1−(15 ms−5 ms)/20 ms). The pixel collection circuits in a second column and in fourth to sixth rows are triggered at the time point 10 ms, so the normalized amplitudes of these pixel collection circuits are 0.75 (1−(15 ms−10 ms)/20 ms). The pixel collection circuits in a third column and in fourth to sixth rows are triggered at the time point 15 ms, so the normalized amplitudes of these pixel collection circuits is 1. The normalized amplitudes of the other pixel collection circuits are 0.

Figure 8E:
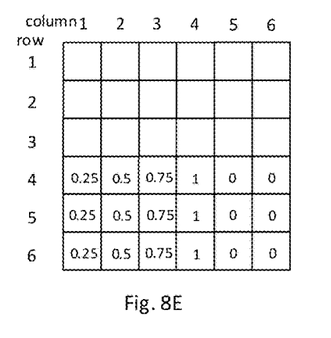

For FIG. 8E (i.e., the time surface frame 4), its reading time point is 20 ms. At and before the reading time point, the pixel collection circuits in a first column and in fourth to sixth rows are triggered at the time point 5 ms, so the normalized amplitudes of these pixel collection circuits are 0.25 (1−(20 ms−5 ms)/20 ms). The pixel collection circuits in a second column and in fourth to sixth rows are triggered at the time point 10 ms, so the normalized amplitudes of these pixel collection circuits are 0.5 (1−(20 ms−10 ms)/20 ms). The pixel collection circuits in a third column and in fourth to sixth rows are triggered at the time point 15 ms, so the normalized amplitudes of these pixel collection circuits are 0.75 (1−(20 ms−15 ms)/20 ms). The pixel collection circuits in a fourth column and in fourth to sixth rows are triggered at the time point 20 ms, so the normalized amplitudes of these pixel collection circuits are 1. The normalized amplitudes of the other pixel collection circuits are 0.

Figure 8F:
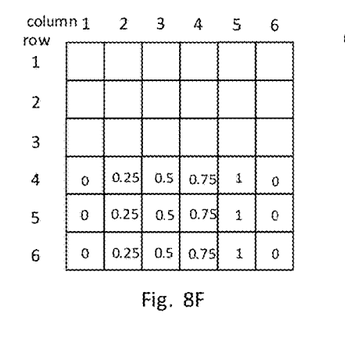

For FIG. 8F (i.e., the time surface frame 5), its reading time point is 25 ms. At and before the reading time point, the pixel collection circuits in a first column and in fourth to sixth rows are triggered at the time point 5 ms, so the normalized amplitudes of these pixel collection circuits are 0 (1−(25 ms−5 ms)/20 ms). The pixel collection circuits in a second column and in fourth to sixth rows are triggered at the time point 10 ms, so the normalized amplitudes of these pixel collection circuits are 0.25 (1−(25 ms−10 ms)/20 ms). The pixel collection circuits in a third column and in fourth to sixth rows are triggered at the time point 15 ms, so the normalized amplitudes of these pixel collection circuits are 0.5 (1−(25 ms−15 ms)/20 ms). The pixel collection circuits in a fourth column and in fourth to sixth rows are triggered at the time point 20 ms, so the normalized amplitudes of these pixel collection circuits are 0.75 (1−(25 ms−20 ms)/20 ms). The pixel collection circuits in a fifth column and in fourth to sixth rows are triggered at the time point 25 ms, so the normalized amplitudes of these pixel collection circuits is 1. The normalized amplitudes of the other pixel collection circuits are 0.

Figure 8G:
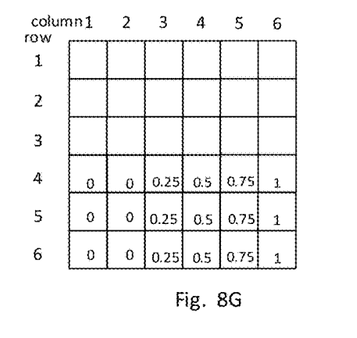

For FIG. 8G (i.e., the time surface frame 6), its reading time point is 30 ms. At and before the reading time point, the pixel collection circuits in a first column and in fourth to sixth rows are triggered at the time point 5 ms, so the normalized amplitudes of these pixel collection circuits is 0 (a time period between the current reading time point and a time point at which these pixel collection circuits were previously triggered is greater than the discharging time 20 ms). The pixel collection circuits in a first column and in fourth to sixth rows are triggered at the time point 10 ms, so the normalized amplitudes of these pixel collection circuits are 0 (1−(30 ms−10 ms)/20 ms). The pixel collection circuits in a third column and in fourth to sixth rows are triggered at the time point 15 ms, so the normalized amplitudes of these pixel collection circuits are 0.25 (1−(30 ms−15 ms)/20 ms). The pixel collection circuits in a fourth column and in fourth to sixth rows are triggered at the time point 20 ms, so the normalized amplitudes of these pixel collection circuits are 0.5 (1−(30 ms−20 ms)/20 ms). The pixel collection circuits in a fifth column and in fourth to sixth rows are triggered at the time point 25 ms, so the normalized amplitudes of these pixel collection circuits are 0.75 (1−(30 ms−25 ms)/20 ms). The pixel collection circuits in a sixth column and in fourth to sixth rows are triggered at the time point 30 ms, so the normalized amplitudes of these pixel collection circuits is 1. The normalized amplitudes of the other pixel collection circuits are 0.

According to the image sensor 100 in the embodiments of the present disclosure, the pixel collection circuit 200 is provided with the additional time signal generation module 220 for generating a local time signal. Usually, the time signal is a voltage signal, and it is an instantaneous voltage pulse when an event has been detected by the pixel collection circuit 200 and then attenuated gradually to indicate the elapse of time. The peripheral reading unit 130 is provided with the additional time signal row selection sub-module 1324 and the additional time signal column selection sub-module 1344, so as to regularly scan the time signals outputted by the time signal generation modules 220 of all the pixel collection circuits 200, thereby to generate and output the time surface frame.

In a word, the image sensor 100 may asynchronously detect the dynamic information like the conventional dynamic vision sensor, and directly output the time surface frame representing the time information about the pixel collection circuit to a back-end machine vision algorithm. The time surface frame may be used by the back-end machine vision algorithm as a train sample, and use to implement such tasks as object identification and tracking. As a result, it is able to reduce the overhead of storage and computation for data conversion at a back end of an image processing system, thereby to improve the efficiency of the image processing system.

It should be appreciated that, although with a large number of details, these specific details are not necessary for the implementation of the present disclosure. In some embodiments of the present disclosure, the known method, structure or technology is not shown, so as to facilitate the understanding of the present disclosure in a better manner.

It should be further appreciated that, sometimes the features of the present disclosure are described in conjunction with a single embodiment or figure, so as to facilitate the understanding of one or more aspects of the present disclosure. However, the method in the present disclosure shall not be construed as to reflect the intention that the present disclosure asks for more features than those specified in each claims. More definitely, as reflected in the appended claims, the creative aspect lies in the features less than all the features in the above-mentioned single embodiment. Hence, each claim following a specific embodiment may be definitely incorporated into the specific embodiment, and each claim itself may serve as an individual embodiment of the present disclosure.

It should be further appreciated that, modules, units or components in the above examples may be arranged in the device described in the embodiments, or in one or more devices different from the device. The modules may be combined into one module, or each module may be divided into a plurality of submodules.

It should be further appreciated that, the modules may be modified adaptively and arranged in one or more devices different from that mentioned hereinabove. The modules, units or components may be combined into one module, unit or component, or each module, unit or component may be divided into a plurality of submodules, subunits or subcomponents. Apart from the features, processes or units conflicting with each other, all the features, processes or units involved in the specification (including the appended claims, abstract and drawings) may be combined in any form. Unless otherwise defined, each feature in the specification (including the appended claims, abstract and drawings) may be replaced with a same, equivalent or similar feature.

In addition, it should be appreciated that, although some embodiments include some features in the other embodiments, the combination of the features in different embodiments may also fall within the scope of the present disclosure. For example, the features in the appended claims may be combined in any form.

In addition, some of the embodiments have been described as a combination of methods or method elements capable of being implemented by a processor of a computer system or any other device. Hence, the processor including necessary instructions for implementing the methods or the method elements may be used to form a device for implementing the methods or the method elements. In addition, the device is used to achieve functions of the elements.

Unless otherwise defined, such ordinal numerals as "first", "second" and "third" are merely used to differentiate different components rather than to represent any order, number or importance.

Although with the above embodiments, a person skilled in the art may obtain the other embodiments, which also fall within the scope of the present disclosure. In addition, it should be appreciated that, the words are selected in the present disclosure principally for readability and guidance, but shall not be construed as limiting the scope of the present disclosure. Obviously, a person skilled in the art may make further modifications and improvements without departing from the spirit of the present disclosure. The above description is for illustrative but not restrictive purposes, and the scope of the present disclosure shall be subject to the appended claims.

What is claimed is:

1. A pixel collection circuit, comprising:
   a movement detection module configured to detect a change in a light intensity in a field of view, and generate a pixel triggering signal when the change in the light intensity exceeds a predetermined threshold so as to indicate the pixel collection circuit to be in a triggered state; and
   a time signal generation module coupled to the movement detection module and configured to generate a time signal upon the receipt of the pixel triggering signal, the time signal being used to represent time information about a time point at which the pixel collection circuit is triggered,
   wherein the movement detection module and the time signal generation module are coupled to a peripheral reading unit, so that the reading unit scans the pixel collection circuit to output the time information about the pixel collection circuit, the time signal generation module comprises: a first switch, a first end of which is coupled to a fixed voltage, and a second end of which is coupled to a first end of a first buffer; a first capacitor and a first resistor connected in parallel to each other, one end of each of the first capacitor and the first resistor being grounded, and the other end of each of the first capacitor and the first resistor being coupled to the second end of the first switch and the first end of the first buffer; the first buffer, a second end of which is coupled to the first end of a second switch; and the second switch, a second end of which is coupled to a time signal column output line, wherein the first switch or a third switch is controlled by the pixel triggering signal from the movement detection module, and when the pixel triggering signal is active, the first switch or the third switch is turned on; and the second switch or a fourth switch is controlled by a time signal row selection signal from the reading unit, and when the time signal row selection signal is active, the second switch or the fourth switch is turned on.

2. The pixel collection circuit according to claim 1, wherein the time signal indicates an instantaneous voltage pulse when the pixel collection circuit enters the triggered state, and subsequently the time signal is attenuated over time.

3. The pixel collection circuit according to claim 1, wherein the movement detection module comprises:
 a photoelectric detection sub-module configured to monitor a light signal in real time, and output a corresponding electric signal;
 a triggering generation sub-module, a first input end of which is coupled to the photoelectric detection sub-module, a first output end of which is coupled to a reading interface sub-module, and a second output end of which is coupled to the time signal generation module, the triggering generation sub-module being configured to generate a triggering generation signal when the electric signal meets a predetermined triggering condition, and output the triggering generation signal to the reading interface sub-module and the time signal generation module; and
 the reading interface sub-module coupled to the triggering generation sub-module and configured to communicate with the reading unit.

4. The pixel collection circuit according to claim 1, wherein the first resistor is an adjustable resistor, and an attenuation rate of the time signal is determined in accordance with a time constant consisting of the first capacitor and the first resistor.

5. An image sensor, comprising:
 a pixel collection circuit array comprising a plurality of the pixel collection circuits according to claim 1;
 a global control unit configured to control an initial operating state of the pixel collection circuit array; and
 a reading unit configured to scan the pixel collection circuit array progressively, so as to output time information about the pixel collection circuit array.

6. The image sensor according to claim 5, wherein the reading unit comprises:
 a row selection module configured to control the pixel collection circuit array in a row direction;
 a column selection module configured to control the pixel collection circuit array in a column direction; and
 a reading control module coupled to the row selection module and the column selection module, and configured to control an output of each of the row selection module and the column selection module.

7. The image sensor according to claim 6, wherein the row selection module comprises:
 a movement detection row selection sub-module coupled to the movement detection module of the pixel collection circuit via a movement detection row request line and a movement detection row selection line, and configured to respond to a row request signal from the pixel collection circuitry array; and
 a time signal row selection sub-module coupled to the time signal generation module of the pixel collection circuit via each time signal row selection line, and configured to progressively set the time signal row selection lines of the pixel collection circuit as active.

8. The image sensor according to claim 6, wherein the column selection module comprises:
 a movement detection column selection sub-module coupled to the movement detection module of the pixel collection circuit via a movement detection column request line and a movement detection column selection line, and configured to respond to a column request signal from the pixel collection circuit array, the column request signal being active when the pixel collection circuit obtains a row response; and
 a time signal column selection sub-module coupled to the time signal generation module of the pixel collection circuit via a time signal column output line, and configured to read the time signal of the pixel collection circuit via the time signal column output line, the time signal being outputted by the pixel collection circuit when a time signal row selection line coupled to the pixel collection circuit is active.

9. The image sensor according to claim 5, wherein the global control unit is further configured to reset the pixel collection circuit array when the image sensor is powered on, and control the pixel collection circuit array to operate when the pixel collection circuit array is maintained in a stable initial state.

10. A pixel collection circuit, comprising:
 a movement detection module configured to detect a change in a light intensity in a field of view, and generate a pixel triggering signal when the change in the light intensity exceeds a predetermined threshold so as to indicate the pixel collection circuit to be in a triggered state; and
 a time signal generation module coupled to the movement detection module and configured to generate a time signal upon the receipt of the pixel triggering signal, the time signal being used to represent time information about a time point at which the pixel collection circuit is triggered,
 wherein the movement detection module and the time signal generation module are coupled to a peripheral reading unit, so that the reading unit scans the pixel collection circuit to output the time information about the pixel collection circuit,
 the time signal generation module comprises: a third switch, a first end of which is coupled to a fixed voltage, and a second end of which is coupled to a first end of a second buffer; a second capacitor and a constant current source connected in parallel to each other, one end of each of the second capacitor and the constant current source being grounded, and the other end of each of the second capacitor and the constant current source being coupled to the second end of the third switch and the first end of the second buffer; the second buffer, a second end of which is coupled to a first end of a fourth switch; and the fourth switch, a second end of which is coupled to a time signal column output line, wherein the third switch is controlled by the pixel triggering signal from the movement detection module, and when the pixel triggering signal is active, the third switch is turned on;

and the fourth switch is controlled by a time signal row selection signal from the reading unit, and when the time signal row selection signal is active, the fourth switch is turned on.

11. The pixel collection circuit according to claim 10, wherein an attenuation rate of the time signal is determined in accordance with the second capacitor and the constant current source.

* * * * *